United States Patent

McAllister et al.

[11] Patent Number: 4,983,797
[45] Date of Patent: Jan. 8, 1991

[54] METHOD FOR MANUFACTURING A COMPOSITE CAMSHAFT

[75] Inventors: David K. McAllister, Hagerstown; Russell E. Hite, Richmond, both of Ind.

[73] Assignee: Dana Corporation, Toledo, Ohio

[21] Appl. No.: 458,992

[22] Filed: Dec. 29, 1989

[51] Int. Cl.⁵ .............................................. B23K 26/00
[52] U.S. Cl. ................................ 219/121.64; 29/888.1; 29/893.2; 219/121.63; 901/42
[58] Field of Search ............... 219/121.63, 121.64; 29/893.2, 888.1; 401/42

[56] References Cited

U.S. PATENT DOCUMENTS

| | | | |
|---|---|---|---|
| 3,444,759 | 5/1969 | Kueny | 74/567 |
| 3,999,277 | 12/1976 | Hamada | 29/447 |
| 4,118,848 | 10/1978 | Goldschmidt et al. | 29/893.2 |
| 4,293,995 | 10/1981 | Jordan | 29/421 R |
| 4,438,555 | 3/1984 | Tsumuki et al. | 29/505 |
| 4,508,495 | 4/1985 | Monden et al. | 418/63 |
| 4,575,913 | 3/1986 | Sugiuchi et al. | 29/432 |
| 4,597,365 | 7/1986 | Madaffer | 123/90.6 |
| 4,606,150 | 8/1986 | Bannister | 219/121 LC |
| 4,612,695 | 9/1986 | Umeha et al. | 29/505 |
| 4,616,389 | 10/1986 | Slee | 29/156.4 R |
| 4,620,356 | 11/1986 | Maus et al. | 29/432 |
| 4,620,454 | 11/1986 | Sugiuchi et al. | 74/567 |
| 4,644,912 | 12/1987 | Umeha et al. | 123/90.34 |
| 4,660,269 | 4/1987 | Suzuki | 29/523 |
| 4,693,138 | 9/1987 | Hughes et al. | 74/567 |
| 4,708,029 | 11/1987 | Urano | 74/567 |

Primary Examiner—C. L. Albritton
Attorney, Agent, or Firm—MacMillan, Sobanski & Todd

[57] ABSTRACT

An improved method for manufacturing a camshaft. A robot positions a drive gear on a shaft and the gear is laser welded to the shaft. The cam lobes are axially and rotatively positioned on the shaft utilizing a robot and are laser welded to the shaft. Bearing journal sleeves also may be axially positioned on the shaft by a robot and may be laser welded to the shaft. Preferably, the gear, the cam lobes and any bearing journal sleeves are welded utilizing a robot mounted laser welder to achieve fully automated production.

8 Claims, 1 Drawing Sheet

METHOD FOR MANUFACTURING A COMPOSITE CAMSHAFT

TECHNICAL FIELD

The invention relates to camshafts and more particularly to an improved method using robotics and laser welding for manufacturing a composite camshaft.

BACKGROUND ART

A camshaft for an internal combustion engine generally comprises a shaft having integrally formed bearing journals and cam lobes, and a drive gear. The drive gear may be integral with the camshaft or may be machined separately and secured to an end of the camshaft. Most frequently, the camshaft is a forging or a casting. The journals and cam lobes are machined and/or ground to desired configurations. Manufacturing a forged camshaft is expensive. Once the forging is produced, only limited adjustments may be made in the rotational location and profiles of the cam lobes in the final machining and grinding processes. Considerable expense is involved in modifying the forging dies to obtain a different cam lobe position and profile in the forging.

According to another prior art method for manufacturing camshafts, the shaft, the cam lobes, the journals and the drive gear are manufactured as separate components. The lobes, journals and gear were secured to the shaft either by an interference fit, by deforming the shaft, or by welding. When welded, the welding heat adversely affected the temper of the attached parts. This required hardening subsequent to welding. According to a method described in U.S. Pat. No. 3,999,277, the lobes, journals and drive gear could be designed for an interference fit on the shaft and placed in a holder wherein they were aligned for receiving the shaft and held in their final position relative to each other. The lobes, journals and drive gear in the holder were then heated and a cooled shaft was inserted through aligned holes in the parts. When the assembly cooled, the lobes, journals and gear became secured on the shaft by an interference fit. Finally, each part was further secured to the shaft with a fillet weld. However, fillet welding can transfer sufficient heat to the cam lobes, for example, to adversely affect their temper. This requires subsequent heat treating to restore the surface hardness of the cam lobes.

DISCLOSURE OF INVENTION

According to the invention, an improved method is provided for manufacturing a built up or composite camshaft. The journals, cam lobes and drive gear are manufactured separately from a shaft and are provided with holes sized for sliding onto the shaft. The camshaft is assembled by a robot which positions the gear at a predetermined position on the shaft. The gear is staked or welded to the shaft at several points using laser welding. The cam lobes are also positioned on the shaft by the robot and welded to the shaft using laser welding. When separate sleeves are used for bearing journals, they also may be secured to the shaft by laser welding. Each gear, cam lobe and journal may be staked or welded to the shaft, for example, at various spots on each side of the gear, cam lobe or journal. By using laser welding to stake or secure the camshaft components to the shaft, sufficient bonding strength is achieved without subjecting the components to excessive heat which will adversely affect the temper of the components. Thus, the final heat treatment step required when manufacturing welded composite camshafts according to the prior art is eliminated. In addition, thermal distortion is eliminated which eliminates subsequent operations.

Accordingly, it is an object of the invention to provide an improved method for forming a composite camshaft.

Other objects and advantages of the invention will be apparent from the following description and the accompanying drawings.

BEST MODE FOR CARRYING OUT THE INVENTION

Figure 1:
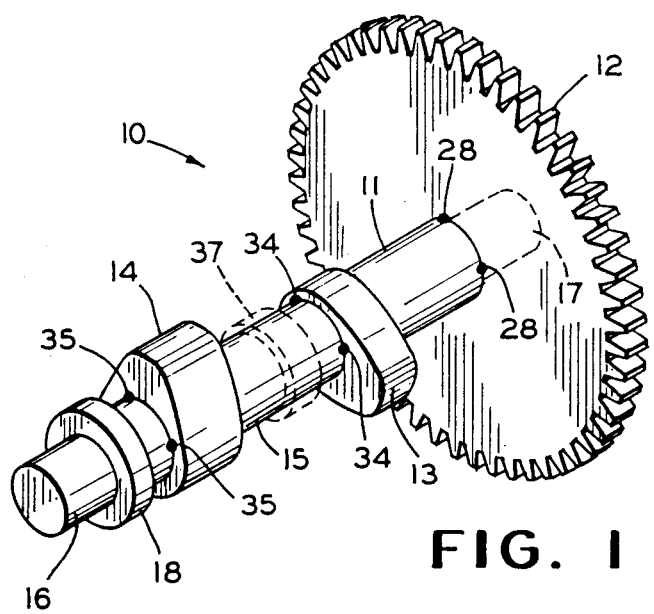
FIG. 1 is a perspective view of an exemplary camshaft manufactured in accordance with the method of the invention.
Figure 2:
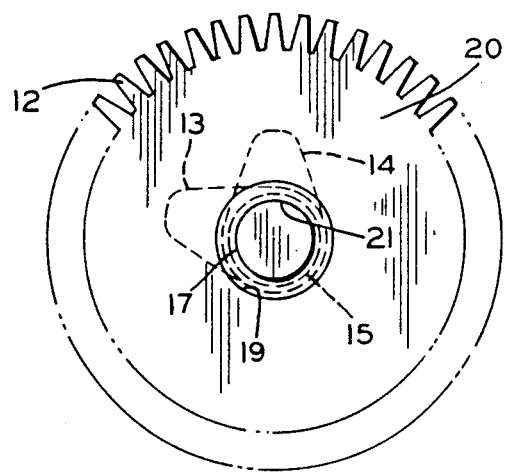
FIG. 2 is an end view of the camshaft of FIG. 1 showing the end adjacent the gear.

Referring to FIGS. 1 and 2 of the drawings, an exemplary camshaft 10 manufactured in accordance with the method of the invention is illustrated. The camshaft 10 has a shaft 11 with a gear 12 and two cam lobes 13 and 14 secured thereon. The shaft 11 is shown as having a uniform diameter mid section 15 and two reduced diameter ends 16 and 17 which form bearing journals. A thrust ring 18 may be integrally formed on the shaft 11 adjacent the end 16 or may be a separate part secured to the shaft 11. To reduce manufacturing costs, the gear 12 may be stamped rather than machined. Further, the gear 12 may be made with an integral thrust face 19 stamped on a surface 20 to surround an axial opening 21.

Figure 3:
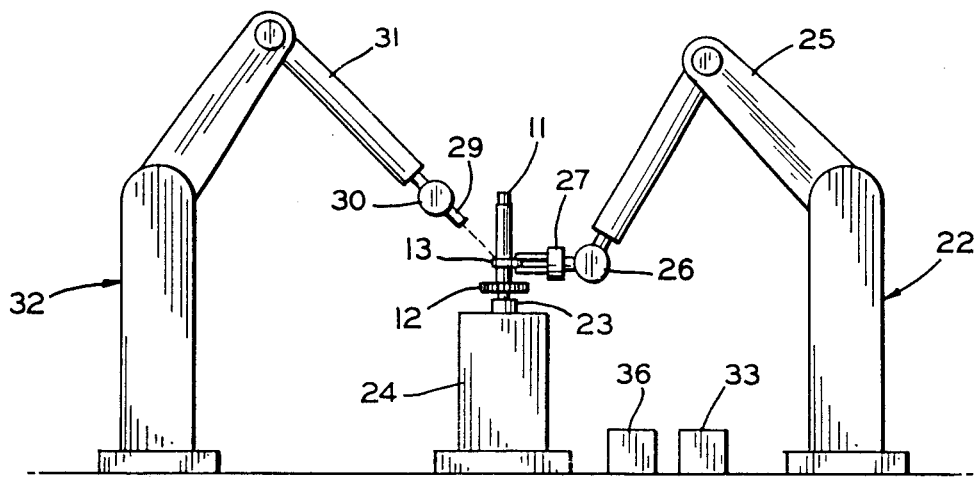
FIG. 3 is a pictorial view illustrating two robots manufacturing a camshaft in accordance with the method of the invention.

According to the invention, the camshaft 10 is manufactured by an automated process using programmable industrial robots, as illustrated in FIGS. 1 and 3. Initially, the shaft 11 may be either held by a robot 22 or positioned by the robot 22 in a jig 23 on a stand 24. The robot 22 has a multi-section arm 25 capable of moving a wrist 26 through space about multiple axes. A hand or parts gripper 27 is secured to the wrist 26. The wrist 26 is capable of moving or rotating the hand about multiple axes. Consequently, the arm 25 can move the parts gripper 27 to any desired location within a work space and the wrist 26 can orient the parts gripper 27 at such location. The robot 22 is programmed to pick up the gear 12 and position it in the jig 23 and to pick up the shaft 11 and position the shaft end 17 through the gear hole 21. While the shaft 11 and the gear 12 are held in position, they are staked or welded together at several spaced points 28. For example, 4 or more weld points 28 may be formed between the gear 12 and the shaft mid section 15. Welding is accomplished by means of a laser welder 29 because of the minimal heat imparted to the gear 12. The heat buildup in the gear 12 is sufficiently small that the temper of the gear 12 is not adversely affected.

The laser welder 29 is mounted on a wrist 30 at the free end of an arm 31 on a programmable industrial robot 32. The robot 32 is program controlled to move and aim the welder 29 for making the welds 28 around the shaft 11 and gear 12. Since the gear 12 is formed with an integral thrust face 19, the welds 28 are placed only on the side of the gear 12 adjacent the shaft mid section 15. No welds are placed between the thrust face 19 and the shaft end 17 which forms a bearing journal. While the shaft 11 and attached gear 12 are secured in the jig 23, the robot 22 moves the gripper 27 to pick up the cam lobe 13 from a suitable source, such as a parts holder 33. The robot 22 positions the cam lobe 13 on the shaft 11 at a proper axial position and at a desired rotative position relative to the gear 12. While the cam lobe 13 is held in place by the robot 22, the robot 32 moves the laser welder 28 and the welder 28 is operated to produce several welds 34 between the cam lobe 13 and the shaft mid section 15. The welds 34 are spaced around the axis for the shaft 11 and preferably are located on both sides of the cam lobe 13.

The robot 22 than releases its grip of the cam lobe 13 and moves to pick up the cam lobe 14 from the parts holder 33, or from another suitable part source. The robot 22 positions the cam lobe 14 at the proper axial and rotative position on the shaft mid section 15 and while holding the cam lobe 14 at this position, the robot 32 moves the laser welder 29 and the welder 29 is controlled to produce several welds 35 between the sides of the cam lobe 14 and the shaft mid section 15. For many applications, 4 welds on each side of the cam lobes 13 and 14 provide sufficient strength to meet or exceed design specifications.

Finally, the robot 22 may be controlled to pick up the thrust ring 18 from a source such as a container 36 and to position the ring 18 on the shaft end 16. While the thrust ring 18 is held in place, the robot moves the laser welder 29 and the welder 29 is controlled to produce several welds (not shown) between the ring 18 and the adjacent shaft mid section 15. No welds are provided on the side of the ring 18 towards the shaft end 16.

Although the bearing journals for the camshaft 10 were illustrated as being formed from the ends 16 and 17 of the shaft 11, it will be appreciated that tubular sleeves may be positioned on the shaft 11 for forming bearing journals. In FIG. 1, such a bearing journal sleeve 37 is illustrated in dashed lines. The robot 22 is programmed to position the sleeve 37 on the shaft at the proper location and at the proper time in the manufacturing process and the robot 32 is programmed to move the laser welder 29 for tacking the ends of the sleeve 37 to the shaft 11.

The composite camshaft manufacturing method of the invention has several advantages over a forged and ground camshaft. The manufacturing costs are significantly lower. Further, camshafts are readily made with different cam properties. The design of the cam lobe is easily changed prior to making the camshaft and during manufacture, the orientation of the cam lobes are easily changed to modify the engine valve timing. The process also permits use of less expensive parts such as stamped gears. The method of the invention also is an improvement over prior art methods for making welded composite camshafts. The use of laser welding minimized the amount of heat applied to the parts which in turn eliminates distortion and does not adversely affect the temper of the parts. No special handling is required for heating or cooling the parts during manufacture, as with composite camshafts using shrink fitting for securing the cam lobes on the shaft.

The illustrated camshaft 10 is of a design suitable for a small single cylinder engine (not shown) since it has only two cam lobes 13 and 14. However, it will be apparent that through the addition of and proper location of cam lobes and bearing journals, the camshaft 10 is readily adapted to larger engines and to engines with more than one cylinder. The bearing journals may be formed in the surface of the shaft 11, or they may be in the form of sleeves which slide onto the shaft 11 and are held at a desired position by laser staking or welding. Further, although the shaft 11 is shown as being solid, it will be apparent that the shaft 11 may be a hollow tube.

It will be appreciated that various other modifications and changes may be made to the camshaft manufacturing method of the invention without departing from the spirit and the scope of the following claims.

We claim:

1. A method for manufacturing a camshaft comprising the steps of:
    (a) utilizing a robot to position a cam lobe at a selected axial and rotative position on a cylindrical shaft; and
    (b) securing said cam lobe to said shaft by laser welding.

2. A method for manufacturing a camshaft, as set forth in claim 1, and further including the steps of
    (c) utilizing said robot to position at least one additional cam lobe at a selected axial and rotative position on said shaft; and
    (d) securing said additional cam lobe to said shaft by laser welding.

3. A method for manufacturing a camshaft, as set forth in claim 2, wherein each of said cam lobes is welded to said shaft by laser welding.

4. A method for manufacturing a camshaft, as set forth in claim 2, wherein said cam lobes are secured to said shaft by welding with a robot mounted laser welder.

5. A method for manufacturing a camshaft, as set forth in claim 4, and further including the steps of utilizing a robot to position, a gear on said shaft, and securing said gear to said shaft by welding with a robot mounted laser welder.

6. A method for manufacturing a camshaft, as set forth in claim 5, wherein said gear is positioned on and secured to said shaft prior to positioning and securing a cam lobe on said shaft, and wherein said cam lobes are rotatively positioned relative to said gear.

7. A method for manufacturing a camshaft, as set forth in claim 6, and further including the steps of utilizing a robot to axially position at least one bearing journal sleeve on said shaft and securing said at least one bearing journal sleeve to said shaft by welding with a robot mounted laser welder.

8. A method for manufacturing a camshaft, as set forth in claim 1, and further including the steps of utilizing a robot to axially position at least one bearing journal sleeve on said shaft and securing said at least one bearing journal sleeve to said shaft by laser welding.

* * * * *